(12) United States Patent
Reid (10) Patent No.: US 7,444,593 B1
(45) Date of Patent: Oct. 28, 2008

(54) DISK SPACE MANAGEMENT AND CLIP REMAINDER DURING EDIT OPERATIONS

(75) Inventor: Glenn Reid, Woodside, CA (US)

(73) Assignee: Apple Inc., Cupertino, CA (US)

( * ) Notice: Subject to any disclaimer, the term of this patent is extended or adjusted under 35 U.S.C. 154(b) by 1010 days.

(21) Appl. No.: 09/679,721

(22) Filed: Oct. 4, 2000

(51) Int. Cl.
*H04N 7/16* (2006.01)
*H04N 7/173* (2006.01)
*G06F 3/00* (2006.01)
*G06F 3/048* (2006.01)
*G06F 13/00* (2006.01)

(52) U.S. Cl. .................. 715/723; 725/115; 725/135; 725/142; 715/838; 715/724; 715/725; 715/835; 345/537; 345/538

(58) Field of Classification Search ............... 725/134, 725/142, 131, 139, 151, 115; 715/719–721, 715/723–725, 276, 530, 726, 835, 838; 345/536–538, 345/562, 543–544
See application file for complete search history.

(56) References Cited

U.S. PATENT DOCUMENTS

| | | | | |
|---|---|---|---|---|
| 5,150,312 A | * | 9/1992 | Beitel et al. ................. 345/418 |
| 5,404,316 A | * | 4/1995 | Klingler et al. ............. 715/723 |
| 5,517,632 A | * | 5/1996 | Matsumoto et al. ......... 711/114 |
| 5,577,190 A | * | 11/1996 | Peters ......................... 345/501 |
| 5,652,613 A | * | 7/1997 | Lazarus et al. ................ 725/50 |
| 5,659,792 A | * | 8/1997 | Walmsley ................ 715/500.1 |
| 5,721,878 A | * | 2/1998 | Ottesen et al. ................. 725/87 |
| 5,724,605 A | * | 3/1998 | Wissner .................... 715/500.1 |
| 5,732,184 A | * | 3/1998 | Chao et al. .................... 386/55 |
| 5,892,536 A | * | 4/1999 | Logan et al. ................... 725/34 |
| 5,917,488 A | * | 6/1999 | Anderson et al. ........... 715/838 |
| 5,943,050 A | * | 8/1999 | Bullock et al. .............. 715/783 |
| 5,966,122 A | * | 10/1999 | Itoh ............................ 715/838 |
| 5,978,868 A | * | 11/1999 | Maas .......................... 710/52 |
| 6,052,508 A | * | 4/2000 | Mincy et al. .................. 386/96 |
| 6,067,608 A | * | 5/2000 | Perry ......................... 711/203 |
| 6,088,703 A | * | 7/2000 | Kaneko .................... 707/104.1 |
| 6,092,128 A | * | 7/2000 | Maas et al. .................... 710/57 |
| 6,134,380 A | * | 10/2000 | Kushizaki .................... 386/55 |
| 6,134,586 A | * | 10/2000 | Walker ......................... 725/87 |
| 6,154,600 A | * | 11/2000 | Newman et al. ............... 386/4 |
| 6,173,317 B1 | * | 1/2001 | Chaddha et al. ............. 709/219 |
| 6,226,038 B1 | * | 5/2001 | Frink et al. ................. 348/443 |
| 6,330,004 B1 | * | 12/2001 | Matsuzawa et al. ......... 715/723 |
| 6,345,318 B1 | * | 2/2002 | Gamon ......................... 710/8 |
| 6,400,378 B1 | * | 6/2002 | Snook ......................... 715/716 |
| 6,473,902 B1 | * | 10/2002 | Noritomi ..................... 725/91 |

(Continued)

*Primary Examiner*—Son P Huynh
(74) *Attorney, Agent, or Firm*—Blakely, Sokoloff, Taylor & Zafman LLP (57) ABSTRACT

The method of storing a time based stream of information to generate a presentation is provided for in which a processing system is used. The methods provide for deleting a selected time based stream of information from the storage medium. In one embodiment, a process manager in the processing system deletes selected information in response to a user selection command. This process manager may further check for reference data to the information and only delete the information is no more than one reference to the selected information exists. A trash depository may be used as an intermediary holding area for the information prior to is deletion. Other aspect of the present invention relating to the processing system conserving storage for a time based stream of information for use in authoring a presentation are also described.

15 Claims, 6 Drawing Sheets

U.S. PATENT DOCUMENTS

| | | | |
|---|---|---|---|
| 6,489,969 B1 * | 12/2002 | Garmon et al. | 715/723 |
| 6,502,139 B1 * | 12/2002 | Birk et al. | 709/233 |
| 6,593,946 B1 * | 7/2003 | Yoda | 715/806 |
| 6,597,375 B1 * | 7/2003 | Yawitz | 715/723 |
| 6,628,303 B1 * | 9/2003 | Foreman et al. | 715/723 |
| 6,629,318 B1 * | 9/2003 | Radha et al. | 725/134 |
| 6,670,966 B1 * | 12/2003 | Kusanagi | 715/723 |
| 6,686,918 B1 * | 2/2004 | Cajolet et al. | 345/473 |
| 6,710,785 B1 * | 3/2004 | Asai et al. | 715/723 |
| 6,763,523 B1 * | 7/2004 | Sacilotto et al. | 725/91 |
| 6,856,320 B1 * | 2/2005 | Rubinstein et al. | 345/543 |
| 7,073,127 B2 * | 7/2006 | Zhao et al. | 715/719 |
| 2002/0059394 A1 * | 5/2002 | Sanders | 709/217 |
| 2002/0070958 A1 * | 6/2002 | Yeo et al. | 345/723 |
| 2003/0149988 A1 * | 8/2003 | Ellis et al. | 725/87 |
| 2005/0204388 A1 * | 9/2005 | Knudson et al. | 725/58 |

* cited by examiner

DISK SPACE MANAGEMENT AND CLIP REMAINDER DURING EDIT OPERATIONS

NOTICE OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods for storing and editing a time based stream of information using a processing system, and more particularly to methods of destructively editing at least portions of a time based stream of information to create a presentation using a processing system.

BACKGROUND

There are many fields, such as entertainment, academics, business, health care, etc., that utilize media having time based streams of information. These time based streams of information may be in the form of full motion images, e.g. video and movies; audio, e.g. music, sound effects, and voice/narration; motion graphics, e.g. animation; still images, e.g. text, pictures; and combinations thereof. The information is usually comprised of a stream of individual units, e.g. frames or blocks. Frequently, this information is in a digital format and resides on any of a number of conventional electronic mediums.

Oftentimes, the time based information is assembled into a presentation through the use of a processing system to edit the information. For example, a video may be edited and combined with audio, text, effects and/or graphics to create a presentation. A "presentation" is any changed version of an original time based stream of information or a modified copy of the original information. In addition, a "presentation" also may further be defined by at least one instruction for representing the original information in a changed form. In such an instruction-based presentation, the information is communicated in the manner according to the instruction. For example, a software program may include directions on how a digital video should be played, for instance, where only certain frames of a video are chosen for display.

Digital editing is typically performed in a processing system and involves random retrieval of information from storage, communication of the information, e.g. display on a monitor, and manipulation of the information to produce the desired presentation. During editing, a user may select specific pieces of information to be included in the presentation from a larger pool of the time based information and arrange the information into a desired order. Portion or portions of sequential information are also referred to as a "clip," such as a continuum of segments, frames, blocks or footage. Typically, the presentation appears as a seamless flow of the edited information.

Editing may further entail removing portions of clips. During editing, particular "edit features" may be added to the presentation, such as transitions between clips, special effects (e.g. black and white, brightness, contrast, texture, echoes, compositing, blurring, etc.), text, graphics, clack background, silent audio segments, combinations of different types of time based streams of information, such as audio and still images, and the like. Various types of editing may be performed as new techniques for altering raw information are created.

Traditionally, editing of multimedia to produce presentations involved complex techniques performed by trained professionals. However, recently novice users have become interested in making presentations, as well. There has been increasing popularity in the processing of multimedia to produce sophisticated home movies, web sites, etc.

Given the currently diverse level of skills among authors of presentations, it is desirable to provide processing a system that is easy and convenient to operate. Such a system should have the required capacity to manage the information needed for the presentation, yet have controls that are simple to operate for the user to manipulate the information.

Although previous authoring systems provide for varying levels of sophistication and ease for the novice user, there are still several drawbacks to these systems. Some prior systems include Studio DV from Pinnacle Systems Inc. of Santa Clara, Calif.; Avid Cinema® from Avid Technology, Inc. of Tewksbury, Mass.; Adobe Premier® from Adobe of San Jose, Calif.; Dazzle* Digital Video Creator™ from Dazzle Multimedia of Fremont, Calif.; and DVgate™ from Sony Corporation of Tokyo, Japan.

In general, processing systems require that the time based stream of information be captured from a media source and entered into the system. The information is stored within memory in the system. Furthermore, during editing, the newly created presentation is also stored by the system. Typically, the presentation is in the form of references that correspond to the stored information. The references may have instructions on handling the information. For example, the references may direct the select portions of the information that are to be included in the presentation.

The time based streams of information entered into the processing system consume an enormous amount of storage space within the system. For long presentations, such as business presentations or short film, the typical processing system provides an insufficient amount of storage space. The footage may consume about 3.6 megabytes per second. A one minute movie may fill about 228 megabytes of storage. For example, a 13 gigabyte hard drive permits approximately a mere 55 minutes of video to be stored. Thus, it would be useful for a processing system to include enough storage space for a given presentation.

In order to increase storage capacity, some previous processing systems employ a redundant array of independent disks ("RAID") to capture the information on multiple hard disks. A two-drive version of these RAID systems may offer 50 GB of video storage and 18 MB/second of information transfer rate. Although such as system may permit about 230 minutes of storage, the cost for the RAID systems can be prohibitive for a casual user.

Another method for saving storage is by shrinking the stored information through various compression techniques. However, increased levels of compression may compromise the appearance of the resulting presentation. Thus, better methods of conserving space are needed.

Oftentimes, only a small portion of the collected and stored streams of information is actually used by a presentation, especially where the user is a novice. Yet, prior systems do not permit information to be deleted during editing once the information is captured. Rather, these processing systems permit the user to control what is viewed in the presentation by moving the in and out points that indicate the segments of information that are to be accessed. Thus, a presentation may include instructions regarding the portion of the information in which output is to begin and the portion of the information where the output is to cease. In these prior systems, the unused portion of the information remains in storage and pointlessly consumes space that is bettered suited for the information that is in fact used for a presentation. A system that would allow for destruction of such undesired portions from storage would conserve storage space and permit the generation of longer and more storage intensive presentations.

Some previous processing systems save storage by first capturing the information in a lower quality than the actual condition of the information from the information source. Such poor resolution information consumes less space than the higher resolution and detailed information. In these prior systems, the user initially views this poor representation of the information and selects the portion of the information that is desired for the presentation. Subsequently, only the selected portion is loaded into the system at high quality. A drawback to these systems is that the user is not able to tell the true quality of information entering the system until after the edited version of the information is stored. Furthermore, the double capture and storage steps take time for the system to perform and wastes the user's time.

In light of the shortcomings of the various currently available systems, there is still a need for creating a presentation of a time based stream of information in a manner that conserves storage space. In particular, there is a desire for a processing system that eliminates unused information from storage. Furthermore, there is a need for a system that includes uncomplicated controls, such as by a simple a user interface, for a user to select and delete portions of captured information.

SUMMARY OF THE INVENTION

In one embodiment of the present invention, a method for managing and storing a time based stream of information in a processing system for generating a presentation is provided. The method allows for conserving storage space by a destructively editing a time based stream of information in a processing system. The method includes storing the time based stream of information in storage, selecting a portion of the time based stream of information the time based stream, receiving a user deletion command, and in response, deleting the portion from the storage.

In various embodiments, a reference is provided that corresponds to the stored time based stream information. The time based stream of information may be selected by the system extracting reference data from at least a portion of the reference that corresponds to the information to be deleted. At times, the extracted reference forms at least one new reference to the remaining time based stream of information. Where the extracted reference data is nested in the reference, the reference may split into a new reference corresponding to the information prior to the extracted data and another new reference corresponding to the information after the data. The method may further include depositing the extracted reference data in a trash depository prior to deleting the portion.

In another embodiment of a method for storing the time based stream of information in a processing system for generating a presentation, a time based stream of information is stored, at least a portion of the time based stream of information is selected in response to a user selection command, it is determined whether the portion is represented by more than one reference data corresponding to the time based stream of information, and the portion of information is deleted from the storage if the portion is not represented by more than one reference data. The portion may be permanently eliminated from storage or the storage space holding the information may be redefined as available for reuse.

In order to generate the presentation of a time based stream of information, a processing system may be employed which a capture port for acquiring time based stream of information. The system includes a storage for storing the time based stream of information, an output device, e.g. display device, and a processor for selecting a portion of the time based stream of information the time based stream and deleting the portion from the storage in response to a user deletion command.

In another embodiment of the processing system, a means for storing the time based stream of information in storage, means for selecting a portion of the time based stream of information the time based stream, means for receiving a user deletion command, and a means for deleting the portion from the storage in response to the user deletion command are provided.

According to still further embodiments, a computer readable medium may be provided that has stored therein a plurality of sequences of instructions, which, when executed by a processing system, cause the processor to perform a variety of processes to related to storing of the time based stream of information and generation of a presentation. The instructions command the processor store the time based stream of information in storage, select a portion of the information, receive a user deletion command and in response delete the portion. Additional sequences of instructions may cause the processor to provide a reference corresponding to the stored time based stream information and extract reference data from at least a portion of the reference. In some cases, the processor is caused to form at least one new reference to the remaining time based stream of information. Of course, other embodiments may provide only the instructions themselves or methods of performing these steps.

Other features and advantages of these and other embodiments are discussed in detail below.

BRIEF DESCRIPTION OF THE DRAWINGS

The present invention is illustrated by way of example, and not limitation, in the figures of the accompanying drawings in which:

FIGS. 3A-3B illustrate a flow charts depicting methods for destructive editing, in accordance with the present processes, wherein FIG. 3A shows a deleting method of checking the for repeat references and FIG. 3B shows a method of erasing information using an intermediary trash depository.

FIGS. 4A-B are examples of user interfaces for editing information into a presentation, wherein FIG. 4A shows controls for editing, selecting and deleting portions of information, and FIG. 4B shows a split reference according to one embodiment of the present invention

DETAILED DESCRIPTION

The methods described below are employed by an authoring tool to conserve storage space during the editing a time based stream of information for generating a presentation. Data intensive files of time based streams of information are stored within a processing system for reference while forming the presentation. Such methods are also for reclaiming storage areas allocated to such files when they are no longer needed.

The processing system that may be utilized by the editing methods has a destructive editing component for deleting a selected time based stream of information from the storage medium. Through a user interface, system permits a user to easily control the editing process and select the information to be included in the presentation. One embodiment of the system incorporates a reference check to determine the existence of any references that correspond to the selected at least portion of information. If there is a single reference or no stored reference to the selected portion, the portion is deleted. Another configuration of the system includes a trash depository to temporarily store the selected portion of information prior to deleting the portion. If a cancel command is received by the system, the system replaces the portion of information from the trash and back to a file in storage rather than deleting the portion.

The time based stream of information and related presentation created by use of the processing system may be of any form, such as full motion images with audio, full images without audio, audio only, still images, motion graphics or any combination thereof.

Hardware Overview

Figure 1:
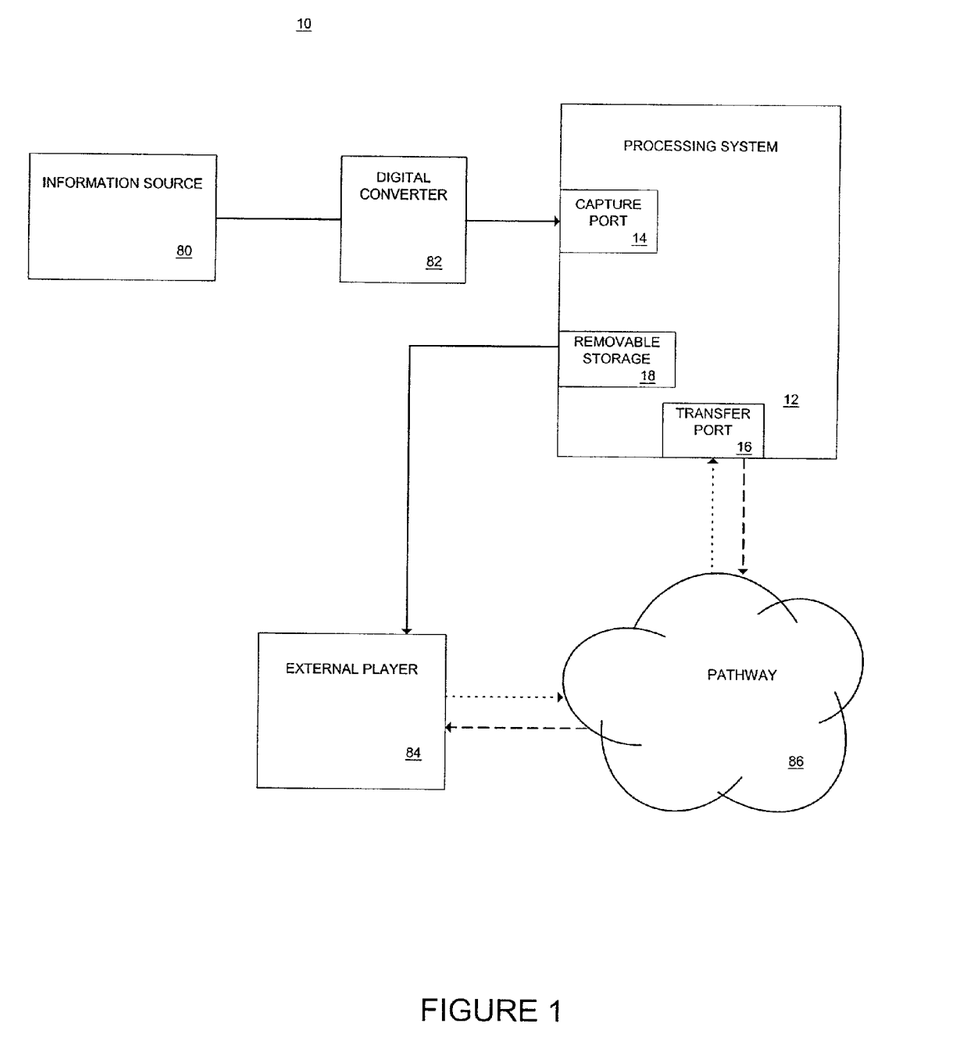
FIG. 1 illustrates one embodiment of an authoring environment in which a time based stream of information may be processed, in accordance with the teachings presented herein.

FIG. 1 illustrates an exemplary authoring environment 10 in which a time based stream of information may be processed to produce a presentation. A processing system 12, according to one embodiment of the present invention, is in communications with an information source 80 that has time based stream of information, at a capture port 14 (i.e. information collection interface) and optionally through an intermediate digital converter 82. Processing system 12 may read, copy, manipulate, store, delete, output, print and/or transfer information provided by source 80. An optional external player 84 receives communication from processing system 12, either indirectly from a transfer port 16 and through pathway 86, and/or directly through a removable storage medium 18. Although FIG. 1 demonstrates one layout of authoring environment 10, the scope of the present invention anticipates any number of information sources and players, configured in accordance herewith and arranged in various fashions.

The information source 80 is any type of device that generates and transfers data or data signals related to the time based stream of information. The information source 80 may be a photographic or full motion image capture interface such as a camera, camcorder, digital camera, etc.; a sound capture interface, such as a laser disc player (e.g. CD player), tape player/recorder, MP3 player, microphone, etc.; a keyboard; a scanner; a computer; a server; a computer program; a sensor; any one of numerous available data collection devices; etc.

The information source may generate digital data signals and be communicatively coupled directly to the processing system 12. Alternatively, the information source may generate signals in a format other than digital, e.g. analog signals. As shown in FIG. 1, such non-digital data source may send signals to a digital converter 82 for changing the signals into a digital format prior to transfer of the data to the processing system 12.

Communication between the information source 80 and the processing system 12 is often through means of a FireWire® (from Apple Computer, Inc. of Cupertino, Calif.), iLink or IEEE 1394 communication protocol. Where a FireWire protocol is employed, capture port 14 in the processing system may be a six-pin FireWire brand port. Also, a corresponding four-pin FireWire brand port may be present on the digital converter 82, where a digital converter is included, and/or on the information source 80. In this case, a six-pin-to-four-pin cable may be used to connect the ports of the digital converter 82 or information source 80 and processing system 12.

Other communication schemes are also suitable for transfer of data from information source 80 and/or digital converter 82 to the processing system 12, such as an Ethernet connection (i.e., capture port 14 may be an Ethernet port), serial interfaces, parallel interfaces, RS422 and/or RS432 interfaces, Livewire interfaces, Appletalk busses, small computer system interfaces (SCSI), ATM busses and/or networks, token ring and/or other local area networks, universal serial buses (USB), PCI buses and wireless (.e.g., infrared) connections, Internet connections, and other communication links for conveying the time based stream of information from an information source 80 to the processing system 12. In addition, source 80 may store the information on a removable storage source, which is coupled to, e.g. inserted into, the processing system 12 and in communication with the capture port 14. For example, the source 80 may be a tape, CD, hard drive, disc or other removable storage medium.

Processing system 12 is any device configured to receive the time based information and manipulate the information to generate a presentation, e.g. a computer system or workstation. In one embodiment, the processing system 12 includes a platform 20, e.g. a personal computer (PC), such as a Macintosh® (from Apple Computer, Inc. of Cupertino, Calif.), Windows®-based PC (from Microsoft Corporation of Redmond, Wash.), or one of a wide variety of hardware platforms that runs the UNIX operating system or other operating systems. Often, the processing system 12 is configured to send the resulting presentation to an external player 84.

The external player 84 may be an IP host, a computer, a personal digital assistance (PDA), a server, a tape/CD/MP3 player, or other device that is configured to receive presentation information from processing system 12 and to display the presentation. In one instance of an authoring environment, the external player 84 is the same device as the information source 80, such as a camcorder. In still another case, no external player is provided and the presentation is played on the processing system and/or projected from the processing system onto a medium, e.g. a screen.

The external player 84 may receive information directly through removable storage 18 from the processing system 12. Removable storage 18 represents any of a number of detachable storage mediums, e.g. magnetic, optical, magneto-optical, tape, and/or other type of machine-readable medium or device for storing information. For example, the removable storage 18 may be a hard disk, a read-only or writeable optical CD (e.g. CD ROM, DVD), a disc, tape, etc.

External player 84 may also receive presentation information indirectly from the processing system 12, such as through a pathway 86. The communication pathway 86 may be through various networking mechanisms, such as a FireWire brand connection (or iLink or IEEE 1394 connection), LAN, WAN, telephone line, serial line Internet protocol (SLIP), point-to-point protocol (PPP), an XDSL link, a satellite or other wireless link, a cable modem, ATM network connection, an ISDN line, a DSL line, Ethernet, or other communication link between the processing system and external player.

Figure 2:
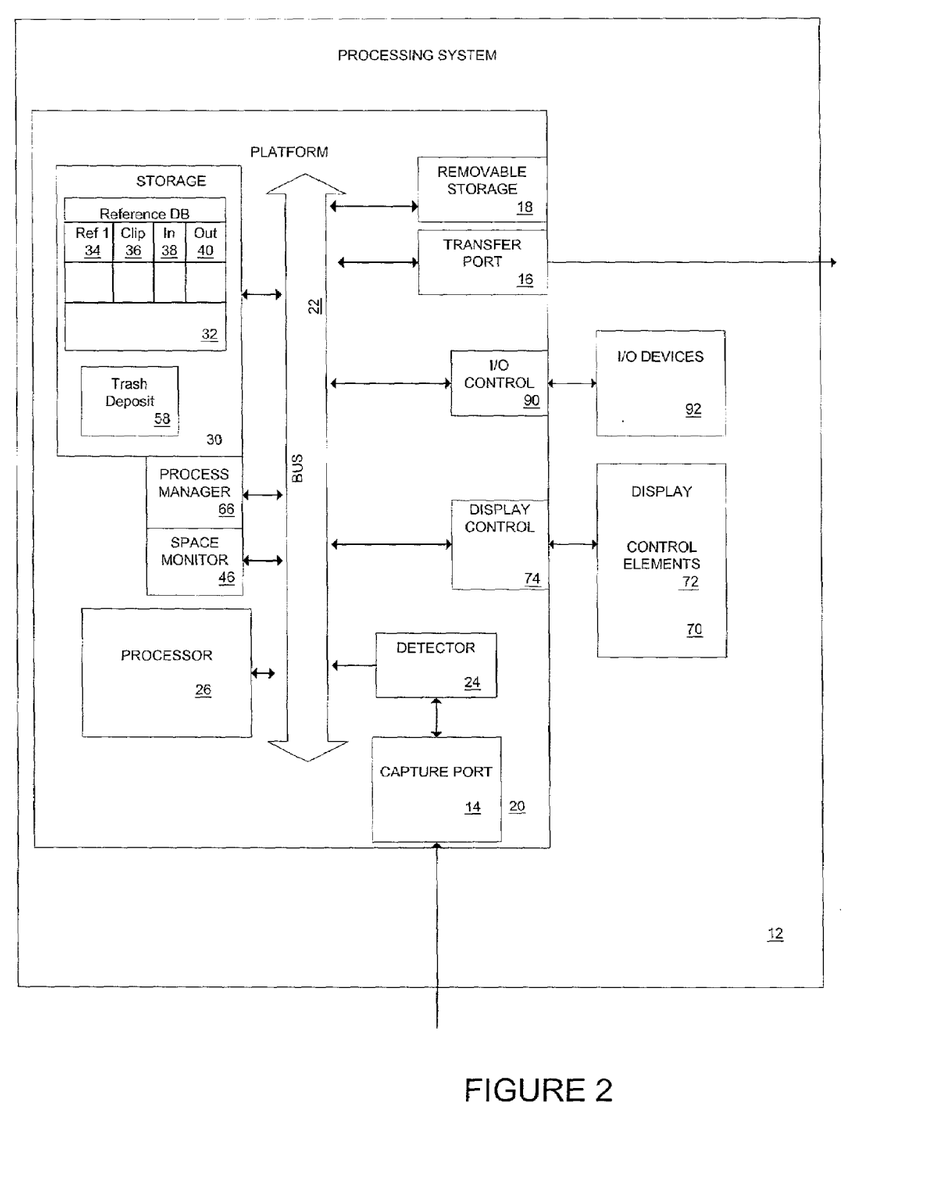
FIG. 2 is a block diagram of one embodiment of a processing system, configured in accordance with the teachings presented herein.

The processing system has components for handling time based information in various ways. As shown in FIG. 2, these components include a capture port 14 for acquiring the information, a storage 30 for holding the information, a processor 26 for manipulating the information, a process manager 66 for instructing the processor on storage of information, a display 70 for showing a user interface and possibly a transfer port 16 or removable storage 18 for sending the information so processed. Upon review of this specification, it will be appreciated by those skilled in the art that the components of processing system 12 may be connected in various ways in addition to those described herein.

Now referring in more detail to the components shown in FIG. 2, processing system 12 includes processor 26, which may represent one or more processors. Some exemplary processors are a Motorola Power PC processor, an Intel Pentium (or x86) processor, etc. The processor 26 may also be a microprocessor. The processor 26 runs an operating system and applications software that controls the operation of other system components. The processor may be configured to perform multitasking of several processes at the same time.

Storage 30 is coupled to processor 26 by a bus 22. The storage 30 may be a dynamic random access memory (DRAM) and/or may include static RAM (SRAM). Typically the storage is a hard disk drive, but may alternatively be another magnetic disk, a magneto-optical disk or other read/write device. The processor may also be coupled to other types of alternative storage areas that may be considered as part of the storage 30 or separate from the storage 30. Such alternative storage areas may include cache, flash memory, etc., and which may also be considered the removable storage 18. Usually storage 30 has a capacity in the megabyte to gigabyte range, and more typically at least 2 gigabytes capacity and can sustain throughput of at least 3.5 megabytes per second of information. However, as technology advances, the capacity of the storage may increase.

The storage contains the acquired time based stream of information within files in the storage as well as executable code that provides functionality for processing the time based stream of information in accordance with the present invention. The storage also has at least one and usually multiple references to the stored information. The reference includes data, e.g. instructions, on how the processor is to read and/or manipulate the stored information. Typically, a reference is an object that corresponds to an individual clip of information. The associated clip may be any length, usually less than 10 minutes, but may be 14 minutes, 19 minutes, or more. The reference data include at least one in-point that specifies where the processor is to start accessing the stream of information and at least one out-point that identifies where to stop access of the information.

A reference database 32 within the storage 30 contains an index of the stored references. Each entry 34 in the database is to a reference. The database contains data found within the reference such as clip 36, in-point 38 and out-point 40. For example, a reference 1 may indicate clip A with an in-point at frame 0 and out-point at frame 60. The database may also include other reference data that assists in generating a presentation.

Further to the storage 30, an optional trash depository 58 may be included to temporarily hold references, reference data, the time based stream of information, or any portions thereof. The contents of the trash depository may be accessed, manipulated, or removed by the processing system. Often, the trash depository 58 serves as a holding bin for unwanted data prior to its deletion from storage. By dropping the data into the trash depository, the user may continue with uninterrupted editing and later empty the trash, i.e., delete the contents and any associated information, at a convenient time.

A process manager 66 is coupled to storage 30 and processor 26 for carrying out various tasks that control the storage of information. During the capturing of information, process manager 66 may allocate space on the storage for keeping a new information file. The process manager receives selection commands, such as from a user input or software instructions, and responds by selecting the appropriate information, which may be an entire file of information or portions thereof. The commands may be provided by a user selecting reference data, where the selected data may be an entire reference or a portion of the reference. The selected information may also include several files of information.

At times, the system may receive a trash and/or delete command, such as from a user input or software instruction. The process manager 66 may respond to the delete command by deleting the relevant information and references thereof. Furthermore, where the selected data is cut and pasted onto a paste board, the process manager may respond to a delete command by deleting the data from the paste board and as well as its associated information.

Such deletion may be by the process manager directly and permanently eliminating the selected information (and associated reference data) from storage. Direct elimination may take place by the process manager copying over the relevant file. If there is any information occurring prior to or after the eliminated section, the remaining information appears to be continuous and uninterrupted. In the alternative, the deletion may also take place by changing a virtual file allocation table (VFAT, FAT or FAT32) to indicate that the space that has been used by that file or a portion of the file is available for reuse by another file. When new files are written to that space, the deleted data is overwritten and thus, permanently eliminated. Prior to this overwriting, it may be possible for the deletion to be reversible.

In one embodiment, direct elimination of information occurs where the beginning portion or middle portion of a clip in a file is selected for deletion. This elimination may occur by various mechanisms. In one embodiment, the system may copy the portion that is to be preserved into a new file and the old file may be removed. In another instance, the system may simply shift over the preserved data to replace the eliminated data. For example, where units 0-30 are to be eliminated from a clip of 0-40, units 31 to 40 may be moved into the space previously occupied by 0-30, thus creating a clip 0-9. In this manner the header information that may be present in the beginning of a clip may also be preserved.

Where a tail end of a clip in a file is to be deleted, the clip may be merely truncated such that the ending portion is marked as extra space that is available for reuse. Thus, the beginning header information is still present in the file. Furthermore, in order to erase all of a file that is selected for elimination, the deletion may take place by merely marking the entire file as deleted and available for reuse as described above.

In any case, where a segment of a clip is deleted, the remaining portion of the clip is preserved in a manner analogous to cutting frames of a film, where the some of the portions are trashed and the rest is kept. In response to a delete command, the process manager selects the appropriate information by extracting the associated reference data from a reference. Where a portion of a reference remains undeleted, the in and out points of the reference associated with the deleted information may be reconfigured to skip the deleted segment and thus form a new reference. For example, where the reference to a clip has an in-point at frame 0 and out-point at frame 60 and segment 31 to 60 is deleted, the reference is reconfigured to have an in-point at frame 0 and out-point at frame 30.

Furthermore, where the deleted information is taken from a portion embedded within a reference, the reference may be split where the deletion occurs. For example, if a segment 31 to 39 is deleted from a reference having an in-point at frame 0 and out-point at frame 60, then one resulting new reference will have in and out points at 0 to 30, respectively, and a second resulting new reference will have in and out points at 40 to 60, respectively.

Figure 3A:
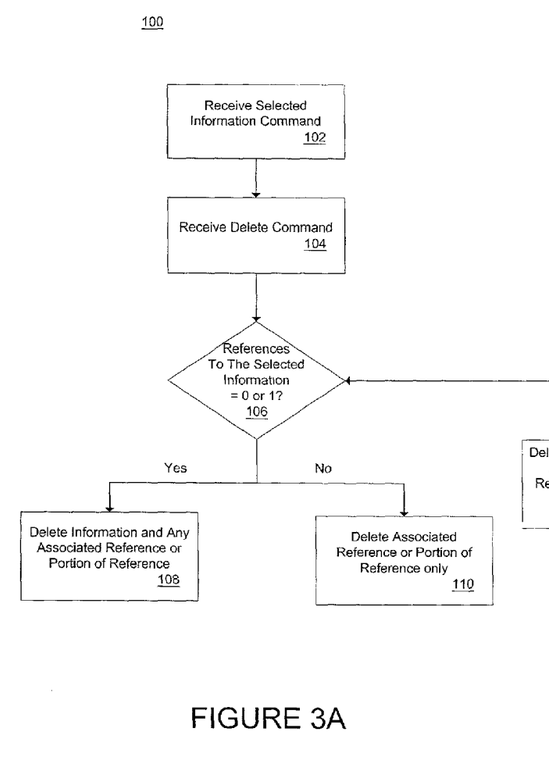
Figure 3B:
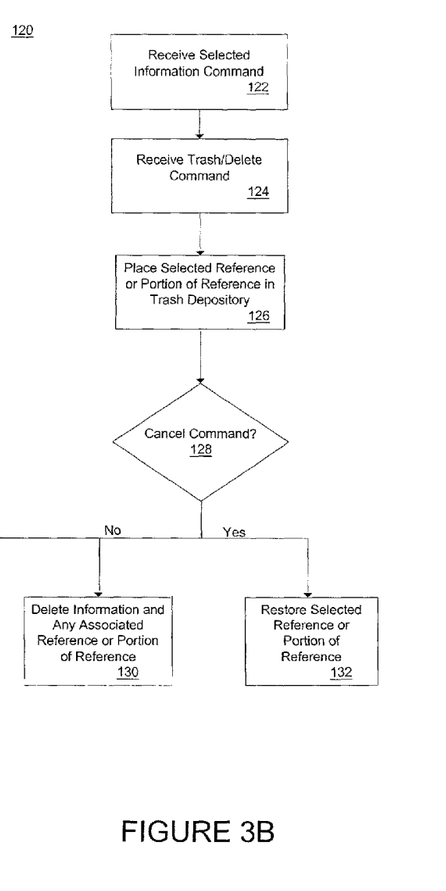

As shown variously by the flowcharts in FIGS. 3A and 3B, the process manager may be triggered to perform several relevant routines upon receipt of the delete command. In one embodiment, a reference check method is performed 100 as shown in FIG. 3A, the system receives a selected information command 102 and a delete command 104. The process manager responds to the delete command by checking in the reference database to determine if a single or no reference data to the selected information exists 106. Where the process manager concludes that more than one reference data set to the selected information exists, the process manager fails to eliminate the selected information from storage. Rather than deleting the information from storage, only the selected reference data is deleted 110. On the other hand, if the process manager establishes that more than one reference data set to the selected information does not exist, the process manager deletes the selected reference data contained within a reference or portion of a reference, if any are such data present in the storage, and also deletes the selected information from storage 108.

In some embodiments of the processing system, as in FIG. 3B, a trash procedure is performed by the process manager 120. The system receives a selected information command 122 and a trash/delete command 124, such as from a user input or software instructions. In response, the process manager extracts the selected reference data, which may be an entire reference or selected portion of a reference and places it into a trash depository 126. At any time while the reference data is in the trash depository, the processing system may receive a cancel command 128, such as from the user or other means. In the case of a cancel command, the process manager returns the reference data back to its original location and restores the initial reference 132, e.g. in and out points, rather than deleting the reference and the information. Where the processing system receives a trash/deleted command and no cancel command is received, the process manager then may either delete the information and associated reference data 130, or in the alternative, respond to the delete command by performing the check procedures from step 106 describe above in regards to FIG. 3A in which the contents are deleted if more than one reference data is not found.

The total amount of storage space available for new files is determined by a space monitor 68. Space monitor 68 is coupled to storage 30 through bus 22. When a new file is created to hold information, the space monitor ascertains the amount of space that is utilized by the new file and subtracts this consumed space to recalculate the remaining amount of space in storage.

In the processing system 12, the processor 26 is further coupled by bus 22 to an input/output (I/O) control 90, a transfer port 16 and/or removable storage 18. The I/O control 90 commands one or multiple I/O device(s) 92. Some conventional I/O devices are key boards, mouses/trackballs or other pointing devices, microphones, speakers, magnetic disk drives, optical disk drives, printers, scanners, digital cameras, etc.

In one configuration of processing system 12, a means for communicating with an information source that has a time based stream of information is provided. For example, bus 22 additionally couples detector 24 to the processor 26. The processing system may detect a connection between the processing system and the information source through detector 24. The detector 24 performs an inquiry as to whether an information source is in communication with the processing system. The detector determines a connection with the information source by sensing particular signals, such as electrical current output, that are released from the information source, and usually when the source is energized, i.e. "turned-on." The detector may be further configured to conduct periodic checks for communication with the information source.

Further to the details of platform 20 in FIG. 2, a display control 74, e.g. video board, is coupled to the processor 26 also through bus 22. The display control 34 communicates with the display 70 in the processing system 12 to couple the display 50 to the platform 20. Display 70 may be any one of a number of conventional display devices such as a liquid crystal display, cathode ray tube, plasma display, video display, or other type of display device. For sharp colors and grayscale, display 70 may be an SVGA monitor, with a resolution of 800×600 (26 dpi) or better, with an active area of at least 15 inches, and may be controlled using a true color video card.

Means are provided for capturing the time based stream of information from the information source, such as a capture card or other capture mechanisms. The transfer rate of the information entering the system is usually the same or substantially the same speed that the information runs prior to entering the system, such as the rates established by the video standards of various regions. For example, movie film usually runs with a speed of 24 fps. Some video follows the NTSC (system used in North America and Japan), where the video speed is 30 fps.

The information may be captured and written into storage by various mechanisms. One capture mechanism is a sequential-type method in which an application procedure is executed when the processing system is in capture mode. In one stage of the application procedure, signals from an information source are captured. The system reads the information, shows the information on the display and writes the information to a storage medium. However, when control elements are activated, the system moves away from the capture step and switches to another stage that includes a process control commands loop for handling the control instructions. The CPU of a system employing such a sequential-type method is dedicated to processing the control commands. While application procedure is in the process control command loop, the capturing operation ceases and the processing system stops communicating with the information source. During this period, the information that is released from the information source does not get loaded into the system. Rather, the processing of control commands continues through to completion, at which time, the capturing step may continue.

Another capture mechanism, according to the present invention, is a low-level interrupt-type method, which effectively permits intermittent processing of control element commands while, at the same time, loading the time-based information. With the interrupt-type method, in addition to the capture application, a user may run any software applications, e.g. network communication protocols, such as Appletalk, Internet or e-mail applications, word processing applications, etc.

An interrupt-type method includes an application procedure that may be executed when the processing system is in capture mode and when it is not in capture mode, e.g. when the system is in edit mode. Where the processing system is operating in a non-capture mode, the application procedure conducts normal operations, such as processing of control commands from control elements. However, when the capture mode is indicated, the interrupt procedure fires the appropriate capture tasks and causes a temporary suspension of the application procedure in an asynchronous manner. Thus, the processing of control commands proceeds until the capture process interrupts the other application tasks.

This interrupt procedure may be performed at periodic intervals and are certain to iterate at regular times, despite the activities, e.g. processing of control commands, of the application procedure. The interrupt procedure includes a quick reading of incoming information, copying the information into a proxy, outputting the information and writing it into storage where the information may be further edited by use of the control elements. The interrupt procedure is advantageous in that the process is very quickly performed and rapidly repeats. The time for performance is less than the transfer rate of the information entering the system.

The repetitions of the interrupt procedure occur at a rate that is substantially similar to or the same as the transfer rate. Thus, all of the information may be read and stored while still processing control commands in-between each of the iterations of the interrupt procedure. As a result, the user does not recognize the interruptions and the capture process as well as other instructions appear to be simultaneously executed by the system. Moreover, the interrupt procedure guarantees that information is not omitted from the reading step because the iterations of the interrupt procedure and length of time to perform are timed to correspond with the rate of information transfer from the information source.

For transfer of NTSC video, the interrupt procedure iterations are typically at least every $1/29$ to $1/30$ second and more usually $1/29.97$ second to $1/30$ second. For PAL systems (systems used in parts of Europe, China and Hong Kong), the frame rate is 25 fps and thus interrupt procedure is substantially at least every $1/25$ second. In general, the interrupt procedure should iterate close to the transfer rate or slightly faster than the transfer rate, e.g. within at least $1/10$th second of the transfer rate and more typically within $1/100$th second. The iterations should not be slower than the transfer rate and the iterations are usually at the rate that corresponds to the frame rate of video standard.

Usually, the processing system according to the present invention, outputs the information, e.g. depicts the information on the display at a rate (the "output rate") that is substantially similar to the rate in which each unit of the information, e.g. frame of video, is arriving from the information source (the "transfer rate"). In contrast with prior systems, where low quality displaying (i.e. considerably lower than the transfer rate, such as 30 to 70% of the transfer rate) is used to devote more of the system to capture, the present invention may use high quality (i.e. the same or substantially similar to the transfer rate, such as greater than 70% and more usually 93 to 100% of the transfer rate) because all of the information is certain to be stored by the interrupt procedure. The speed at which the information is displayed depends on numerous factors, such as side operations being simultaneously performed by the system, e.g. network access and CD ROM detection, image quality, e.g. based on decompression schemes employed, and processor speed or graphic acceleration. For example, where the transfer rate is about 30 frames per second (fps), the corresponding output rate of the present invention is usually 29 to 30 fps. The transfer rate depends on the particular transfer rate standard employed, as described in detail below. The resulting capture output is of high quality that is similar to the quality of the information residing in the information source.

During the capture process, the time based stream of information is written into storage to be referenced while creating the presentation. For convenience, the stored information may be compressed to conserve storage space. Generally, compression formats are either high efficiency or low efficiency and either loss-less or lossy. Lossy compression schemes are characterized by components of an original image being absent from a reconstructed image after a compression-decompression cycle, whereas loss-less schemes do not drop any information.

Low compression schemes (i.e., those that do not provide significant compression ratios) that may be used include joint photographic experts group (JPEG) compression schemes that use Fourier analysis-based methods, such as the discrete cosine transform, to compress data; graphics interchange format (GIF) compression schemes, which use LZW algorithms; bitmapped image compression schemes and tagged image file format (TIFF) compression schemes, etc. Alternatively, high efficiency compression schemes, such as wavelet, motion wavelet, Motion Picture Experts Group (MPEG) motion JPEG, Lempel Ziv and/or fractal compression schemes, etc., may be employed. Use of high efficiency schemes may be preferred where storage space is limited. For example, wavelet compression schemes may be 20 times more efficient than JPEG compression schemes, providing for a more detailed representation of the data at the same bit budget. Once the time based information is captured and stored, it may be referenced for editing and generating a presentation.

The editing of stored information is often through the output, such as depiction on the display or playing on speakers, of capture information from the time based stream of information being acquired, process information useful in the editing process to produce the presentation, control elements, etc. Means for presenting the capture information, process information and control elements are provided.

The present invention additionally involves at least one and usually a plurality of control elements 72, e.g. objects, that may be visible (as shown in FIG. 2) or invisible to the display. Control elements may be used to control the capture process or edit process. Control elements allow a user to manipulate and design a presentation or otherwise control it. The controls may be activated by the user or by other means, such as by software instructions, to create control commands. A user may activate control elements through input/output device 92. Input/output devices useful in activating control elements are keyboards, mouses, other cursor pointing devices, microphone, etc.

The control elements respond to activation by sending instructions to the processor. For example, a processing control element conveys directions to the processor regarding how a clip is to be treated or displayed. Each control element includes properties that describe how it will react when selected by the user or other means.

The processing system may contain any number of different types of control elements. One set of control elements are output controls 248 that implement how the user chooses to view or listen to the information from the system. Output control elements may direct the showing of the information on the monitor window 246, the playing of information through audio speakers, or output through other convenient devices in communication with the system. There are several types of output controls 248 that may be provided by the processing system.

The output controls 248 may be used to move the play-head (i.e. pointer to indicate the location in the information available for use) to particular sections of the information stored in the storage. One such output control is a play control 250 that directs the system to play or show the information. Other kinds of output controls include a rewind control 252 and a forward control 254. The play-head may be jogged backward by the user depressing the rewind control 252 to shuttle the play-head in reverse direction. The output of information is advanced by the user selecting the forward control 254 during playback to shift forward at faster than the normal play rate, e.g. double the speed. Also provided by the processing system may be a stop control 256 for ceasing the output action and a pause control 258 for temporarily suspending the movement of the information from the system. In practice, the stop control 256 may be selected and then the rewind control 252 or forward control 254 selected to quickly skip forward or backwards through the footage.

In one method of outputting the time based information through the use of output controls, the play control 250 is activated and then the rewind control 252 or forward control 254 chosen to move to a position that is a immediately prior to the appropriate position for capture. The stop control 256 is selected and the play control 250 is reactivated. When the scene of interest is displayed or a particular portion of audio is played, the clip may be edited.

Several additional output controls may also be employed for alternative ways of communicating the information. For example, a full screen mode control 252 may be provided to permit the presentation to be shown in a window that spans the entire area of the display. Also, some control elements may adjust the quality of playback. A preferences option with a playback tab (not shown), and an edit pull down menu 254 are some optional quality controls. In addition, a sound control knob 256 functions to adjust the intensity of audio.

A smooth motion control may be present to allow the user to create a smoother playback than would be typically expected. Usually, the bandwidth necessary to display digital video requires that visual quality be compromised in order to deliver a high number of frames per second (fps) during playback. Also, a better image control may be included to provide a crisper playback and more detail from each frame displayed. Such option for a better image is often at the expense of motion quality. The number of frames per second that may be displayed is dependent on the processing power of the system, where higher power results in higher frame rate and playback that is less choppy.

Some forms of control elements that are visible on the screen are buttons, "pop-up" or pull-down menus, scroll bars and iconic images. Other control elements may be invisible to the screen and thus are not included on the GUI. There are a variety of interactive mechanisms to activate the control elements, such as keyboard input, voice command, mouse manipulation, text entry, pen-to-text data entry device, touch screen, network signals, satellite transmissions, preprogrammed triggers within the system, instructional input from other applications, etc. All of the control elements described herein are by way of example and are not intended to limit the choices that are or may become available in the art.

Other control elements are not visible on the screen but may be present on input/output devices, such as a keyboard that is in communication with the I/O control. For example, a space bar on a keyboard may also be depressed to start capture and depressed again to stop capture of the information on the fly while playing the time based information during capture mode.

The table shown below describes other control elements that may be present on the keyboard, where the items in the "action" column describe the command activated by depressing the keyboard button and the items in the "shortcut" column are the corresponding keyboard buttons.

| Keyboard shortcuts | |
|---|---|
| Action | Shortcut |
| Navigation | |
| Play/Stop and Start/Stop Capture | Space Bar |
| Play-head to Beginning of Movie | Home |
| Play-head to End of Movie | End |
| Forward One Frame | Right Arrow |
| Forward Ten Frames | Shift + Right Arrow |
| Roll Play-head Forward | Hold Down Right Arrow |
| Search Forward (fforward) | Command + ] |
| Back One Frame | Left Arrow |
| Back Ten Frames | Shift + Left Arrow |
| Roll Play-head Backward | Hold Down Left Arrow |
| Search Backward (rewind) | Command + [ |
| Selection | |
| Multiple Selection | Shift + Click Item |
| Multiple Selection (range) | Click 1st item then Shift + Click last item |
| Moving/Cropping | |
| Move Audio Clip | Click Clip + Left or Right Arrow |
| Move Audio Clip Ten Frames | Click Clip, then Shift + Left or Right Arrow |
| Move Crop Marker | Click Marker + Left or Right Arrow |
| Move Crop Marker Ten Frames | Click Marker, then Shift + Left or Right Arrow |
| Accept/Cancel | |
| Accept Dialogs (OK) | Return |
| Cancel Dialogs | Esc or Command + C |
| Cancel Rendering | Command + . (period) |
| Volume | |
| Increase System Volume | Up Arrow |
| Decrease System Volume | Down Arrow |
| Titling | |
| Move Between Text Fields | Tab |
| File Menu Functions | |
| New Project | Command + N |
| Open Project | Command + O |
| Save Project | Command + S |
| Export Movie | Command + E |
| Save Frame As | Command + F |
| Import File | Command + I |
| Quit | Command + Q |
| Edit Menu Functions | |
| Undo | Command + Z |
| Redo | Shift + Command + Z |
| Cut | Command + X |
| Copy | Command + C |
| Paste | Command + V |
| Crop | Command + K |

-continued

Keyboard shortcuts

| Action | Shortcut |
| --- | --- |
| Split Clip at Play-head | Command + T |
| Select All | Command + A |
| Select None | Command + D |
| Help Menu Functions | |
| iMovie Help | Command + ? or Help key |

The visible control elements as well as other editing data may be depicted on a graphical user interface (GUI) on the display.

Figure 4A:
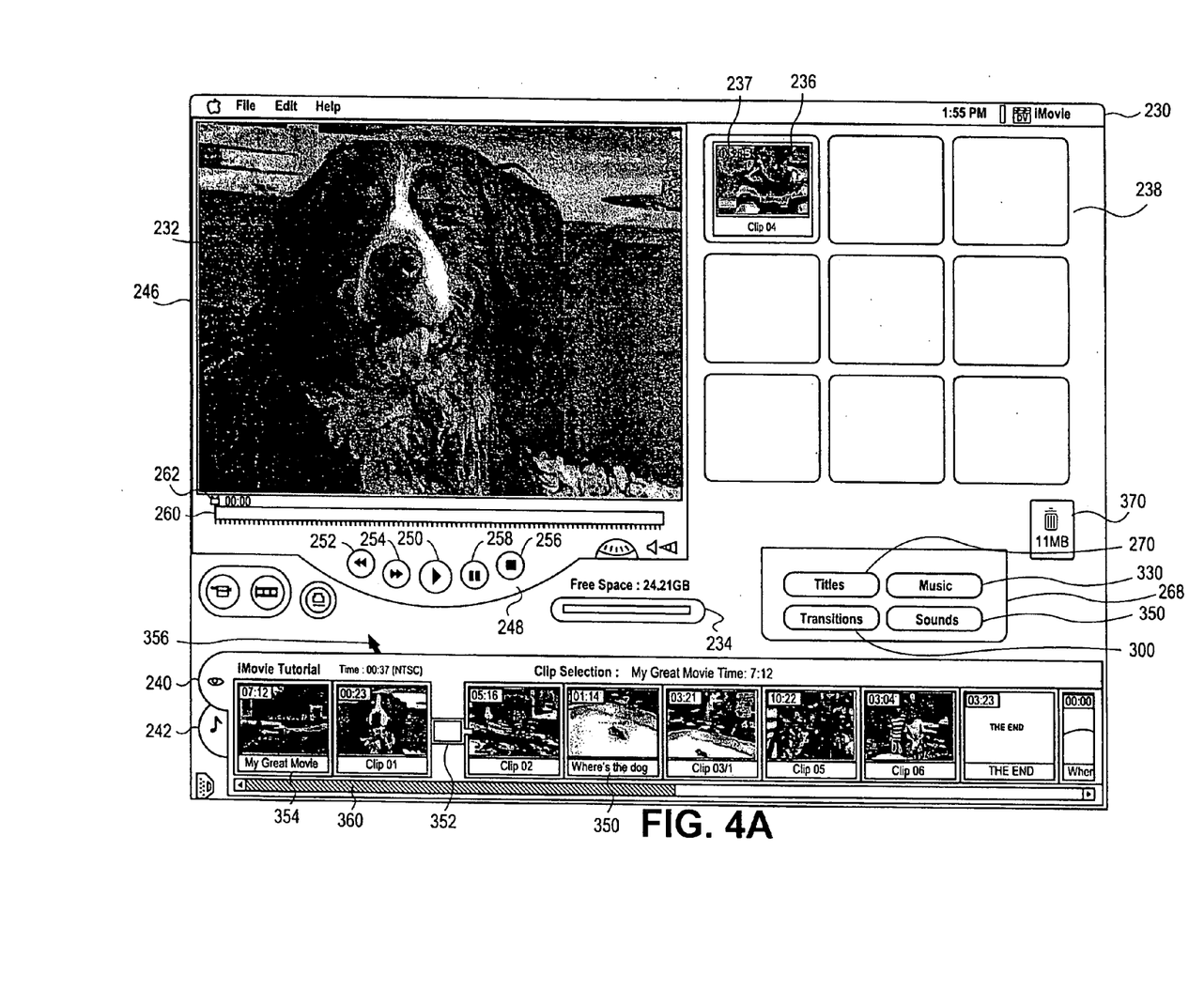

FIG. 4 depicts an exemplary GUI 230 for displaying both capture information and process information on the display 70. Capture information is related to the time based information being acquired by the system while in capture mode. The capture information may include a depiction or replay of the time based stream of information (referred to as a "capture output") 232, as well as other characteristics of the information that is being acquired. The capture output sets forth the current frames that are being received and read, such as newly acquired information that is present in a proxy, i.e. buffer, prior to being written into storage. A time code 237 may be provided as capture information that indicates the length of a clip. In addition, the capture information may include an audio synch time line 242 on which references to clips 236 are arranged and depicted in size according to the length of the clip in storage. A user may opt for the audio synch time line to automatically display the references for each incoming stream of information. For example, the user may choose a preferences control from a menu and select to have the references appear in the audio synch time line rather than the shelf portion of the user interface. The capture information may further include a space monitor element 234 to show the amount of storage space remaining or amount of space consumed by stored information. Capture information may also include tools, e.g. control elements, for controlling the capture process.

The process information displayed on the GUI 230 may include at least one object reference element 236, e.g. icon, with each reference element 236 being associated with a reference in storage that has data for a clip of the time based information contained in storage 30. Typically, the reference element 236 is displayed as a "thumbnail" in the form of a still image of the first frame of the associated clip. The reference element may be provided on a shelf 238 portion of the GUI 230. By selecting the associated reference element or portion thereof, and employing other process information, individual clips, or portions of clips, may be edited.

Other process information displayed on the GUI 230 may also include at least one control element for the user to manipulate the time based information and construct a presentation, at least one time line that represents the edited presentation, such as video time line 240 and audio time line 242, and other elements that add convenience to the edit process.

The process information may also include an edit output to reveal stored clips of the time based information for processing/editing during an edit mode. The edit output may depict how the clips would appear in presentation after editing is complete. For example, the user may desire to modify a clip, such as add a title or transition to a clip. The user may observe the edit output of the clip with the selected title or transition and the user may choose to accept or reject the modification.

The present invention frequently has a single GUI to display enabled, i.e. operable, capture information and enabled, i.e. operable, process information. Such a GUI is functional for both capture and edit procedures, thus avoiding the necessity of switching to multiple GUI's to view and work with information relating to capture and information relating to the processing of the presentation. Any convenient portions of the screen may be used to show the capture and process information without the user needing to toggle between screens. In one instance, a portion of the display provides capture information, such as the capture output, and another portion of the display contains process information. An example of this embodiment is where capture information is shown in a window on the display, and process information in at least one other window on the display. In the alternative, the same portion of the display may be used to show capture information and process information at different times. In one such embodiment, a capture output may be presented on a viewing portion of the display during capture of the time based information and an edit output may be presented on the same viewing portion during editing of the presentation.

Typically, one or more windows are present in the GUI, which may be opened by processor 26 or by the user. One such user interface illustrated in FIG. 4 has a monitor window 246. During the capture mode, the monitor window 246 may exhibit the capture output of the time based information. This monitor window may be the viewing portion of the display that shows the capture output and edit output.

In addition to showing the capture output, the monitor window 246 may depict the edit output, usually where the capture output is shown while the information is acquired and the edit output is shown while editing the presentation. By this dual use of the monitor window, the screen area is conserved and the user interface is simplified. Various other windows may be present on the display of the processing system to provide at least one control element.

The user may manipulate the clip representations 236 in forming segments of a presentation. In one embodiment, a representation is moved to various portions of the display by moving a cursor over the representation that may be on a shelf 238, a video time line 240, an audio time line 242 or other portion of the display and dragging the representation to another portion of the display. Other functionalities may be present to relocate the representations such as mouse clicks, keyboard commands, control elements, etc.

The representation may be moved by the user to the monitor window 246 so that the clip may be viewed on the monitor window. A monitor window time line 260 depicts where the play-head 262 as it travels along the course of the clip. A variety of output controls 248 may be used to move the play-head to various positions on the clip. When the play-head is at the frame of interest, the pause control 258 may be activated and the frame edited. In this manner, particular portions of information may be selected by the user and the system may be further instructed to edit the selected portion, e.g. deleting the selected portion from storage.

Figure 4B:
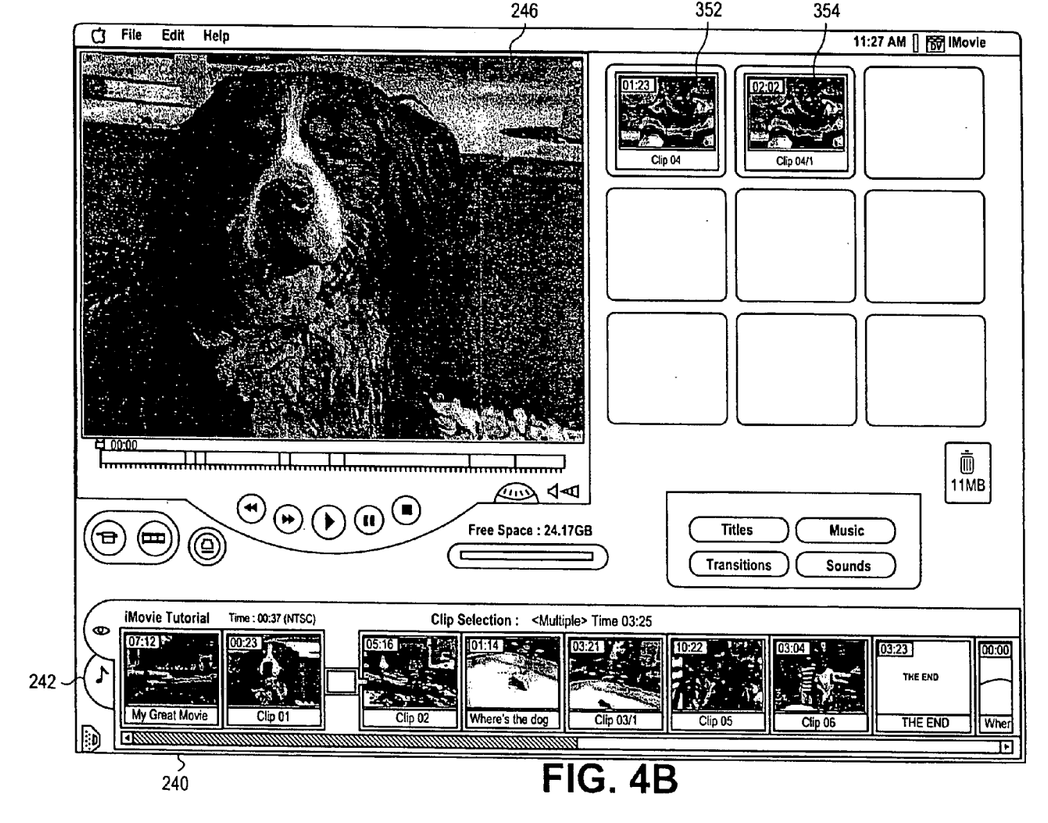

In one example, a clip may be split into multiple clips. A reference (Clip 04, 3:25 in length) 236 (shown as an original reference in FIG. 4A) may be selected from the shelf 238 or from a time line 240, 242 and depicted on the monitor window 246. The play-head travels across the monitor window time line 260 and is paused or stopped at a position of interest. FIG. 4B illustrates one GUI for cutting a portion of a clip and presenting a remainder to a user. The reference may be split at the play-head to form a reference (Clip 04, 1:23 in length) 352 and reference (Clip 04/1, 2:02 in length) 354. Where either reference 352 or 354 is deleted, the undeleted clip remains and is available for use. Thus, a portion of a clip may be deleted and the remaining portion is presented to the user.

In addition, where a user does not need a segment of information for the presentation, a clip or portion of a clip may be removed from storage. Entire clips or portions of clips may be deleted by selecting the reference data and dragging it to the trash icon control 370. After depositing the reference data in the trash, the user may activate a delete control. For example, the user may select an "empty trash" e.g. from a pull down menu. In still other embodiments, the user may activate a "cut" command, e.g. from a pull down menu, to have the selected data placed on a paste board. The user may then send delete instructions to the processing system and the data as well as corresponding information is deleted. In another embodiment, an intermediary trash bin or paste board is not used and the user simply elects to delete selected reference data. Other methods for the user to send selection, deletion and trash commands are also possible and intended by the present invention.

Particular segments of information are aligned in the order that they will appear in the presentation. Each clip that is to be included in the presentation is positioned in the presentation by arranging the clips representation along a video time line 240 or audio time line 242.

A selected clip may be edited by use of the edit box 268 that includes various editing options, such as titles control 270, transitions control 300, music control 330 and sound control 350.

Title control 270 includes instructions for adding text, such as headings, labels or captions, to a clip. Selection of the title control 270 opens a title window. A transition time-line shows the length of the selected clip and the position of the play-head. The user may navigate the play-head to various frames in the clip by positioning a cursor over the play-head by use of a mouse, or using other cursor positioning means. The mouse may be used by clicking and holding down on it and sliding the mouse to the left or right along the title time-line relative to the desired location of the play-head.

The title window also includes one or more text field for creating text to be inserted in the clip. A position menu permits the user to choose where and how the text is to appear on the frame. For example, the text may be a centered title, appear to bounce through the length of the frame and the like. A font menu may be used to dictate the character type. An "over black" control is used to insert an additional black frame at the play-head position and the title over the black frame. On the other hand, a "color" control may be used to insert the text over depiction in the current frame. The text may be shown in a preview window 290 by selecting a preview control. Preview simulates the edited clip without the edited version being actually saved in storage. An add control is for storing the clip with the title. The edited clip with title may then be shown on the monitor window. A separate title reference may be formed to represent the edited clip with title, as shown on video time-line.

A transition control 300 has instructions for inserting an effect between clips, where selection of the transition control 300 opens a transition window. An effects menu permits the user to choose from any one of numerous transition options. Examples of transitions are cross dissolve, cross dissolve slow, fade in, fade out, and the like. The frame location of the play-head along transition time line may be positioned by the same or similar manner as described above for introducing titles in a clip. The transition is typically inserted as a frame immediately after the play-head position. At the point of the inserted transition frame, the clip appears to split with clip 01 reference representing the portion of the clip preceding the transition and clip 02 reference indicating the clip immediately after the transition frame, as shown on video-time line.

Furthermore, edit box 268 includes music control 330 for incorporating music tracks to the presentation and sound control 350 for including sound effect to portions of the presentation. Usually, the sound effects are prerecorded and stored within the processing system.

The presentation, as edited, may be saved in a variety of formats, such as a QuickTime file or other formats suitable for transfer via e-mail, web pages, CD-ROM, etc. The presentation may be accessed at a later time for additional editing or may be transferred from the processing system, such as conveyed to an external player.

In addition to the features described above, the processing system may further include alternative aspects that enhance ease and convenience of use. For example, referring again to FIG. 1, the information source 80 may be controlled through the processing system 12. Source controls operate the information source 80, usually where no digital converter 82 is employed as an intermediate between the information source and processing system. The source controls may be presented on the GUI. In one embodiment, the output controls 248, as shown in FIG. 2 also serve as the source controls to direct the monitor window views at one time and send action commands to the information source 80 at another time. Thus, the source controls may include rewind control 252, forward control 254, play control 250, pause control 258 and stop control 256.

Software Overview

Figure 5:
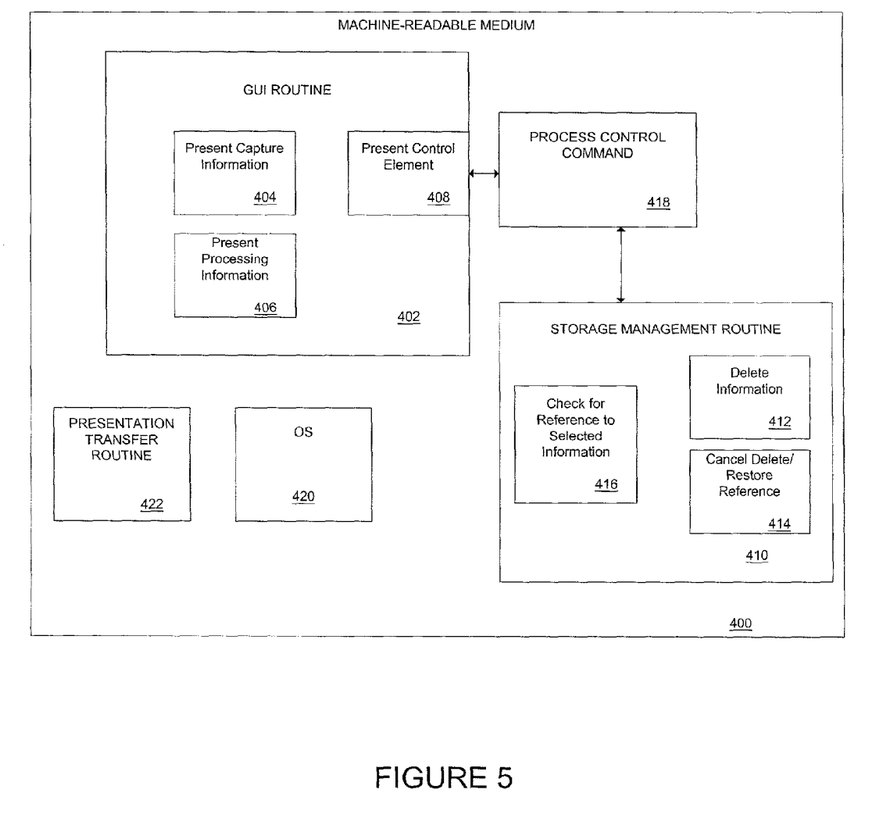
FIG. 5 is a block diagram of a machine-readable medium storing executable code and/or other data to provide one or a combination of mechanisms for processing a time based stream of information, configured in accordance with one embodiment of the present invention.

Various software components may be provided within or in communication with the system that cause the processor to execute the numerous methods employed in creating the presentation. FIG. 6 is a block diagram of a machine-readable medium storing executable code and/or other data to provide one or a combination of mechanisms for collecting and manipulating the time based stream of information, according to one embodiment of the invention. The machine-readable storage medium 400 represents one or a combination of various types of media/devices for storing machine-readable data, which may include machine-executable code or routines. As such, the machine-readable storage medium 400 could include, but is not limited to one or a combination of a magnetic storage space, magneto-optical storage, tape, optical storage, dynamic random access memory, static RAM, flash memory, etc.

The machine readable storage medium 400 is shown storing a GUI routine 402, which, when executed, provides a GUI for display of capture and process information regarding the time based stream of information, such as the GUI 230 shown in FIG. 3. The GUI routine 402 includes a number of mechanisms for playing or otherwise processing the time based stream of information. For example, a show capture information routine 404 provides capture information, including a capture output from the time based stream of information onto a portion of the display, e.g. monitor window 246, in response to information being acquired and according to control element commands, as described with regards to FIG. 4. A present process information routine 406 provides process information and present control elements 408 permits control elements to be visible on the display.

The medium 400 also has a process control command routine 418, that directs the carrying out of various commands, i.e. processing control elements, such as for manipulating information and constructing a presentation and for executing side operations. The control commands may be generated by activation of control elements by the user. Upon receipt of the control commands, the process control command 418 may send instructions to the GUI routine 402 to specify particular information to be presented or manner of presenting information. The process control command 418 routine may also send the commands to a storage management routine, such as a delete command, select information command, cancel delete command, and the like, as described below.

The medium also has a storage management routine 410 that may have various subroutines for conducting various tasks related to controlling storage space. One such subroutine is a delete information subroutine 412, which when executed, information is deleted from storage as well as associated reference data, if any such data are present. The storage management routine 410 may be also configured for conducting a check for reference to selected information subroutine 416 to determine the presence of reference data to the selected information, as described with regards to FIG. 3A. A cancel delete/restore reference subroutine 414 may optionally be included whereby selected information is not deleted and the selected information's associated reference data is returned to a reference database. Such cancel delete/restore reference subroutine includes steps as described in regards to FIG. 3B.

Other software components may include an operating system 420 and a presentation transfer routine 422 that facilitates communication of information from the processing system, such as via external player 84. Various modes of transfer are described above with reference to the external player 84 in FIG. 1.

The software components may be provided in as a series of computer readable instructions that may be embodied as data signals in a carrier wave. When the instructions are executed, they cause a processor, such as through a browser to perform the capture and editing steps as described. For example, the instructions may cause a processor to communicate with an information source, provide capture information from the time based stream of information on a first portion of a display, provide process information for constructing the presentation on a second portion of the display; and provide at least one enabled control element. Such instructions may be presented to the processor by various mechanisms, such as a plug-in, ActiveX control, through use of an applications service provided or a network, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described information transfer system as well as methods of its use without departing from the broad scope of the invention. Therefore, the following claims and their legal equivalents should determine the scope of the invention.

What is claimed is:

1. A method of destructively editing a time based stream of information in a processing system, the method comprising:
    capturing the time based stream of information from an information source having a transfer rate into a storage of the processing system;
    partitioning in a first display area of a display of the processing system the time based stream of information into a first portion and a second portion, the first portion and the second portion being displayed as a first thumbnail and a second thumbnail in the first display area, wherein the first thumbnail includes a first reference referenced to a first segment of the time based stream of information stored in the storage and the second thumbnail includes a second reference referenced to a second segment of the time based stream of information stored in the storage;
    displaying in a second display area of the display of the processing system for authoring a presentation having a plurality of video clips in sequence, wherein each of the plurality of the video clips can be formed by selecting one of the thumbnails displayed in the first display area and placing the selected thumbnail into a particular location of the second display area;
    in response to a user input, playing in a third display area of the display the presentation authored in the second display area;
    selecting the first portion of the time based stream of information from the first display area;
    in response to receiving a user deletion command for deleting the first portion, determining whether there are multiple references from one or more video clips of the second display area and/or from thumbnails displayed in the first display area that are currently referenced to the first portion; and
    permanently deleting the first portion of the time based stream of information from the storage if there is no more than one reference currently referenced to the first portion, without examining storage capacity state, in response to the user deletion command such that the first portion is no longer stored on the storage and is thereby destructively edited;
    providing reference data corresponding to the stored time based stream information an wherein the selecting is by extracting the reference data from at least a portion of a reference, wherein the reference forms at least one new reference with reference data to the remaining time based stream of information, and
    wherein the extracted reference data is from a portion nested within the reference and the reference splits into a first new reference corresponding to the time based stream of information prior to the extracted reference data and a second new reference corresponding to the time based stream of information after the extracted reference data.

2. The method of claim 1, further including depositing the extracted reference data in a trash depository prior to deleting the first portion.

3. The method of claim 1, further comprising permanently eliminating the first portion of the time based stream of information from storage directly without an intermediary step.

4. A method for managing storage in a processing system, comprising:
    capturing a time based stream of information from an information source having a transfer rate into a storage of the processing system;
    partitioning in a first display area of a display of the processing system the time based stream of information into a first portion and a second portion, the first portion and the second portion being displayed as a first thumbnail and a second thumbnail in the first display area, wherein the first thumbnail includes a first reference referenced to the first segment of the time based stream of information stored in the storage and the second thumbnail includes a second reference referenced to a second segment of the time based stream of information stored in the storage;

displaying in a second display area of the display of the processing system for authoring a presentation having a plurality of video clips in sequence wherein each of the plurality of the video clips can be formed by selecting one of the thumbnails displayed in the first display area and placing the selected thumbnail into a particular location of the second display area;

in response to a user input, playing in a third display area of the display the presentation authored in the second display area;

selecting the first portion of the time based stream of information in response to a user selection command;

in response to a deletion command received from a user for deleting the selected first portion determining whether the first portion is represented by more than one reference data containing processing information corresponding to the time based stream of information; and permanently deleting the first portion of the time based stream of information from the storage of the processing system if there is no more than one reference data associated with the first portion containing processing information corresponding to the time based stream of information, without examining storage capacity state, such that the first portion is no longer stored on the storage and is thereby destructively edited;

wherein the selecting is by extracting corresponding reference data from at least a portion of a reference, the reference forms at least one new reference to the remaining time based stream of information after extracting; and wherein the extracted reference data is nested in the reference and the reference splits into a first new reference corresponding to the time based stream of information prior to the extracted reference data and a second new reference corresponding to the time based stream of information after the extracted reference data.

5. The method of claim 4, further including depositing corresponding reference data in a trash depository prior to deleting the first portion of the time based stream of information.

6. The method of claim 5, wherein the deleting further includes determining if a cancel command is not received.

7. The method of claim 4, wherein if a cancel command is received, the extracted reference data is replaced in the reference and the first portion is not deleted.

8. A method of claim 4, further comprising permanently eliminating the first portion of the time based stream of information from storage directly without an intermediary step.

9. A time based stream of information processing system comprising:

a storage for storing a time based stream of information;

a capture port for acquiring the time based stream of information from an information source having a transfer rate into the storage;

a display device for presenting a graphical user interface (GUI) for editing the time based stream of information stored in the storage wherein the time based stream of information is partitioned in a first display area a first portion and a second portion the first and second portions being displayed as a first thumbnail and a second thumbnail representing the first and second portions wherein the first thumbnail includes a first reference referenced to a first segment of the time based stream of information stored in the storage and the second thumbnail includes a second reference referenced to a second segment of the time based stream of information stored in the storage wherein any of the first and second thumbnails can be selected and placed into a second display area of the display for authoring a presentation, and wherein the presentation can be played in a third display area of the display; and a processor for selecting the first portion of the time based stream of information and in response to a user deletion command for permanently deleting the first portion from the storage if there is no more than one references referenced to the first portion, without examining storage capacity state, such that the first portion is no longer stored on the storage and is thereby destructively edited;

wherein the storage further includes at least one reference having data corresponding to the time based stream of information and the processor is further for deleting the reference data;

wherein the processor is further for forming at least one new reference with reference data to the remaining time based stream of information after deleting the reference data;

wherein the selecting is by extracting corresponding reference data from at least a portion of a reference; and wherein the extracted reference data is nested in the reference and the reference splits into a first new reference corresponding to the time based stream of information prior to the extracted reference data and a second new reference corresponding to the time based stream of information after the extracted reference data.

10. The system of claim 9, wherein the display device includes a deletion control.

11. A processing system for destructively editing a time based stream of information to generate a presentation comprising:

means for capturing the time based stream of information from an information source having a transfer rate into a storage of the processing system;

means for partitioning in a first display area of a display of the processing system the time based stream of information into a first portion and a second portion, the first portion and the second portion being displayed as a first thumbnail and a second thumbnail in the first display area, wherein the first thumbnail includes a first reference referenced to a first segment of the time based stream of information stored in the storage and the second thumbnail includes a second reference referenced to a second segment of the time based stream of information stored in the storage;

means for displaying in a second display area of the display of the processing system for authoring a presentation having a plurality of video clips in sequence, wherein each of the plurality of the video clips can be formed by selecting one of the thumbnails displayed in the first display area and placing the selected thumbnail into a particular location of the second display area;

in response to a user input, means for playing in a third display area of the display the presentation authored in the second display area;

means for selecting the first portion of the time based stream of information from the first display area;

in response to receiving a user deletion command for deleting the first portion, means for determining whether there are multiple references from one or more video clips of the second display area and/or from thumbnails displayed in the first display area that are currently referenced to the first portion; and means for permanently deleting the first portion of the time based stream of information from the storage if there is no more than one reference currently referenced to the first portion, without examining storage capacity state, in response to the user deletion command such that the first portion is no longer stored on the storage and is thereby destructively edited;

means for providing a reference corresponding to the stored time based stream information and wherein the selecting is by extracting at least a portion of the reference;

wherein the extracted reference forms at least one new reference to the remaining time based stream of information; and wherein the extracted portion is from a portion nested in the reference and the reference splits into a first new reference corresponding to the time based stream of information prior to the extracted reference data and a second new reference corresponding to the time based stream of information after the extracted reference data.

12. The system of claim 11, further comprising permanently eliminating the first portion of the time based stream of information from storage directly without an intermediary step.

13. A computer readable medium encoded with a plurality of computer-executable instructions being executed by a processing system for collecting a time based stream of information and generating a presentation, cause the processor to perform:

capturing the time based stream of information from an information source having a transfer rate into a storage of the processing system;

partitioning in a first display area of a display of the processing system the time based stream of information into a first portion and a second portion, the first portion and the second portion being displayed as a first thumbnail and a second thumbnail in the first display area, wherein the first thumbnail includes a first reference referenced to a first segment of the time based stream of information stored in the storage and the second thumbnail includes a second reference referenced to a second segment of the time based stream of information stored in the storage;

displaying in a second display area of the display of the processing system for authoring a presentation having a plurality of video clips in sequence, wherein each of the plurality of the video clips can be formed by selecting one of the thumbnails displayed in the first display area and placing the selected thumbnail into a particular location of the second display area;

in response to a user input playing in a third display area of the display the presentation authored in the second display area;

selecting the first portion of the time based stream of information from the first display area;

in response to receiving a user deletion command for deleting the first portion, determining whether there are multiple references from one or more video clips of the second display area and/or from thumbnails displayed in the first display area that are currently referenced to the first portion; and permanently deleting the first portion of the time based stream of information from the storage if there is no more than one reference currently referenced to the first portion, without examining storage capacity state, in response to the user deletion command such that the first portion is no longer stored on the storage and is thereby destructively edited;

providing a reference corresponding to the stored time based stream information and wherein the selecting is by extracting reference data from at least a portion of the reference, wherein the extracted reference forms at least one new reference with reference data to the remaining time based stream of information, and wherein the extracted reference is from a portion nested in the reference and the reference splits into a first new reference corresponding to the time based stream of information prior to the extracted reference data and a second new reference corresponding to the time based stream of information after the extracted reference data.

14. The computer readable medium of claim 13, further including additional sequences of executable instructions, being executed by the processor, cause the processor to deposit the extracted reference data in a trash depository prior to deleting the first portion.

15. The computer readable medium of claim 13, further comprising permanently eliminating the first portion of the time based stream of information from storage directly without an intermediary step.

* * * * *